(12) United States Patent
Rose

(10) Patent No.: US 6,918,571 B1
(45) Date of Patent: Jul. 19, 2005

(54) SOLENOID OPERATED VALVE ASSEMBLY AND METHOD OF MAKING SAME

(75) Inventor: Stephen Rose, Rochester Hills, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/992,062

(22) Filed: Nov. 18, 2004

(51) Int. Cl.[7] .............................................. F16K 31/06
(52) U.S. Cl. ........................ 251/129.18; 251/129.15; 335/255; 335/258; 335/273; 335/274
(58) Field of Search ....................... 251/129.08–129.1, 251/129.15–129.22; 335/255, 256, 258, 261, 270, 273, 274

(56) References Cited

U.S. PATENT DOCUMENTS

| | | | |
|---|---|---|---|
| 4,218,021 A | * 8/1980 | Palma ..................... | 239/585.2 |
| 4,535,816 A | * 8/1985 | Feder et al. ............ | 137/625.65 |
| 5,513,673 A | 5/1996 | Slavin et al. ........... | 137/625.65 |
| 5,513,832 A | 5/1996 | Becker et al. .......... | 251/129.18 |
| 5,853,028 A | 12/1998 | Ness et al. .............. | 137/625.65 |
| 6,269,827 B1 | 8/2001 | Potter ........................... | 137/14 |
| 6,386,218 B1 | 5/2002 | Ness et al. ..................... | 137/14 |
| 6,386,220 B1 | 5/2002 | Koenings .................. | 137/15.21 |

* cited by examiner

Primary Examiner—Ramon M. Barrera
(74) Attorney, Agent, or Firm—Roger A. Johnston

(57) ABSTRACT

A soleniod operated valve has an operating rod attached to the armature with one end of the rod contacting the end of a valve member for effecting movement thereof upon coil energization. A lower bearing is disposed in a lower flux collector adjacent one end of the rod. An upper bearing surface is disposed on an adjustment member threadedly engaging an upper flux collector with the armature return spring between the armature and upper bearing for maximizing bearing separation and improving armature alignment and reducing hysteresis.

18 Claims, 3 Drawing Sheets

SOLENOID OPERATED VALVE ASSEMBLY AND METHOD OF MAKING SAME

BACKGROUND OF THE INVENTION

The present invention relates to solenoid operated valves of the type employing a spool type valving member which is moved by an operating rod connected to the armature of a solenoid. Valves of this type are often intended for proportional pressure control in response to a variable electrical signal. The invention particularly relates to the aforesaid proportional control valves of the type intended for operation from low voltage direct current power supplies as, for example, the 12 volt D.C. power supply provided on-board a motor vehicle.

Solenoid operated proportional control valves of the type operating from a vehicle power supply, are often employed for generating a hydraulic fluid pressure signal for shift control in an automatic transmission or other types of fluid operated actuators where precise control of the valve outlet pressure is required. In such applications, problems have been encountered with hysteresis and friction in the bearings supporting the operating rod and the armature. This has resulted in erratic valve performance and is imprecise or inadequate control of the pressure output in response to an electric control signal.

Heretofore, known solenoid operated pressure control valves have utilized an operating rod typically supported by a pair of bearings or bushings disposed in spaced relationship along the rod with a return spring bearing on the axial end of the armature for providing a bias in the desired operating direction e.g., either to the normally open or normally closed position depending upon the valve application.

However, the prior art valves as shown in FIG. 3 have employed the upper operating rod bearing or bushing denoted by reference numeral 1 disposed in the upper flux collector or pole piece 2 and a lower bearing 8 disposed in a lower flux collector 9 which is attached to the valve body. A return spring 3 is mounted axially outboard of the upper bearing 3; and, the preload of the spring adjusted by an adjustment member 4 threadedly engaging upper pole piece 2. This arrangement has encountered problems of hysteresis and misalignment of the operating rod and armature with respect to the conical working air gap 5 formed between the upper end of the armature and the lower end of the flux collector 2. Thus, it has been desired to provide a simple low cost way or means of reducing the hysteresis and improving the proportional control of a solenoid operated valve, particularly valves operated by low voltage direct current power supplies as found on board motor vehicles.

BRIEF SUMMARY OF THE INVENTION

The present invention provides a solenoid operated pressure control valve having a valve member, preferably of the spool type, moved by an operating rod connected to the armature. The operating rod and armature are guided by bearings or bushings disposed at opposite ends thereof wherein the upper bearing is disposed on an adjustment member threadedly received in the upper flux collector or pole piece with the armature bias spring disposed between the armature and the adjustment member. The arrangement of the adjustment member, armature and return spring of the present invention thus maximizes the distance between the opposing bearings for the operating rod and thus minimizes the effect of friction, hysteresis and provides greater accuracy for alignment of the armature.

DETAILED DESCRIPTION OF THE INVENTION

Figure 1:
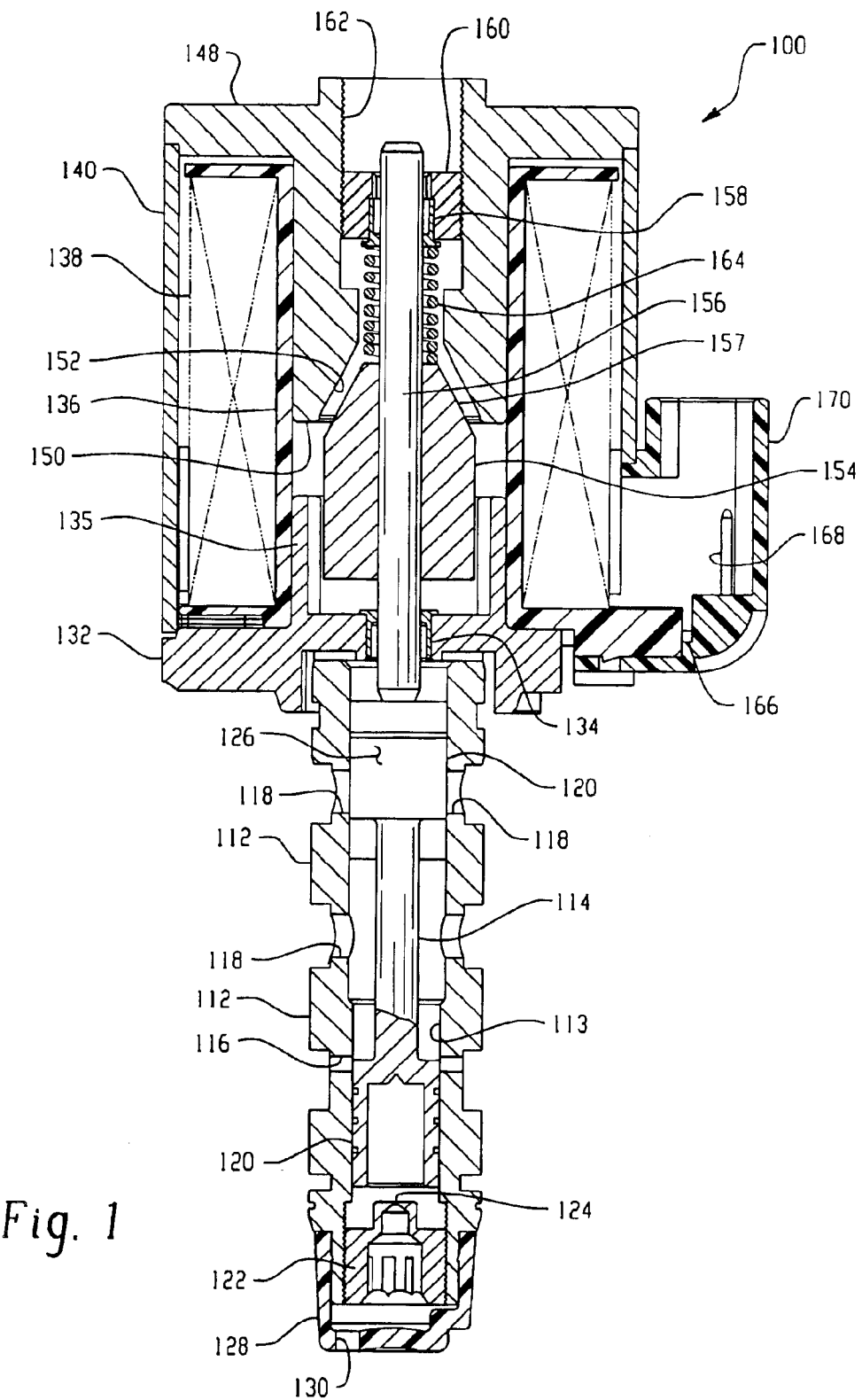
FIG. 1 is a cross-section of the valve assembly of the present invention in a first embodiment.

Referring to FIG. 1, an embodiment of the invention is illustrated generally at 100 and has a valve body 112 with a valving member 114, preferably in the form of a spool, disposed in closely fitting sliding arrangement in a valving chamber in the form of bore 113 for valving flow between an inlet port 116 and an outlet port 118 which communicate with the bore 113 in spaced axial arrangement. The valving member 114 has a valving land 120 provided thereon for moving between positions increasing and decreasing the opening between bore 113 and outlet 118.

The lower end of bore 113 is closed by a plug 122 which preferably is threadedly engaged in the bore 113. A second or lower land 126 is formed on the end of the spool distal the land 120; and, land 126 serves to guide the spool in the bore and maintain fluid pressure in chamber 113. Plug 122 has a bleed orifice 124 formed therein for bleeding seepage around land 120.

A reservoir cover 128 is received over the end of the body 112 and plug 122, which cover has a vent port 130 formed therein.

A lower flux collector 132 is attached to the body 112 and has a lower bearing or bushing 134 provided therein with a bobbin 136 received thereon over a pilot or upwardly extending guide portion 135 formed on the flux collector 132.

A solenoid coil 138 is wound of electrically conductive material on bobbin 136; and, a cylindrical shell or casing 140 is received over the coil 138 and attached to flux collector 132 at its lower end. An upper flux collector 148 is mounted on the casing 140 and has a pole piece portion 150 extending downwardly into the interior of the bobbin 136; and, the inner diameter of the bobbin is registered on the pole piece 150. Pole piece 150 has an annular tapered surface 152 formed in the lower end thereof; and, a correspondingly tapered armature 154 is disposed slidably in the flux collector guide 135 with an operating rod 156 attached to the armature 154 and extending exteriorly in an upward and downward direction therefrom.

The lower end of operating rod 156 is slidably received in the lower bushing 134 with the end of the rod contacting the end of valve member 114. The upper end of operating rod 156 extends upwardly through pole piece 148 and is guided in a bearing or bushing 158 which is disposed in an adjustment member 160 which is preferably threadedly received in internal threads 162 formed in the upper end of flux collector 148.

An armature return spring 164 has the upper end thereof registered against bearing 158 or alternatively the undersurface of adjustment member 160 and the lower end registered against the upper end of armature 154 thereby biasing the armature and operating rod 156 in a downward direction to maintain the lower end of rod 156 in contact with the upper end of valve member 114. The spring 164 thus maintains a space between the tapered surface 157 on the armature and the surface 152 on the pole piece 150.

In reference to FIG. 1, the coil 138 is connected via connector 166 molded in the lower flange of bobbin 136 to terminal pins, one of which is shown at 168 which extends upwardly within a receptacle shell 170 attached over the flange of the bobbin.

The arrangement of FIG. 1 thus permits the upper bearing 158 to be placed closer to the upper end of the operating rod 156 for improved positioning of the operating rod and armature 154 attached thereto and thus minimizing the effects of hysteresis.

Figure 2:
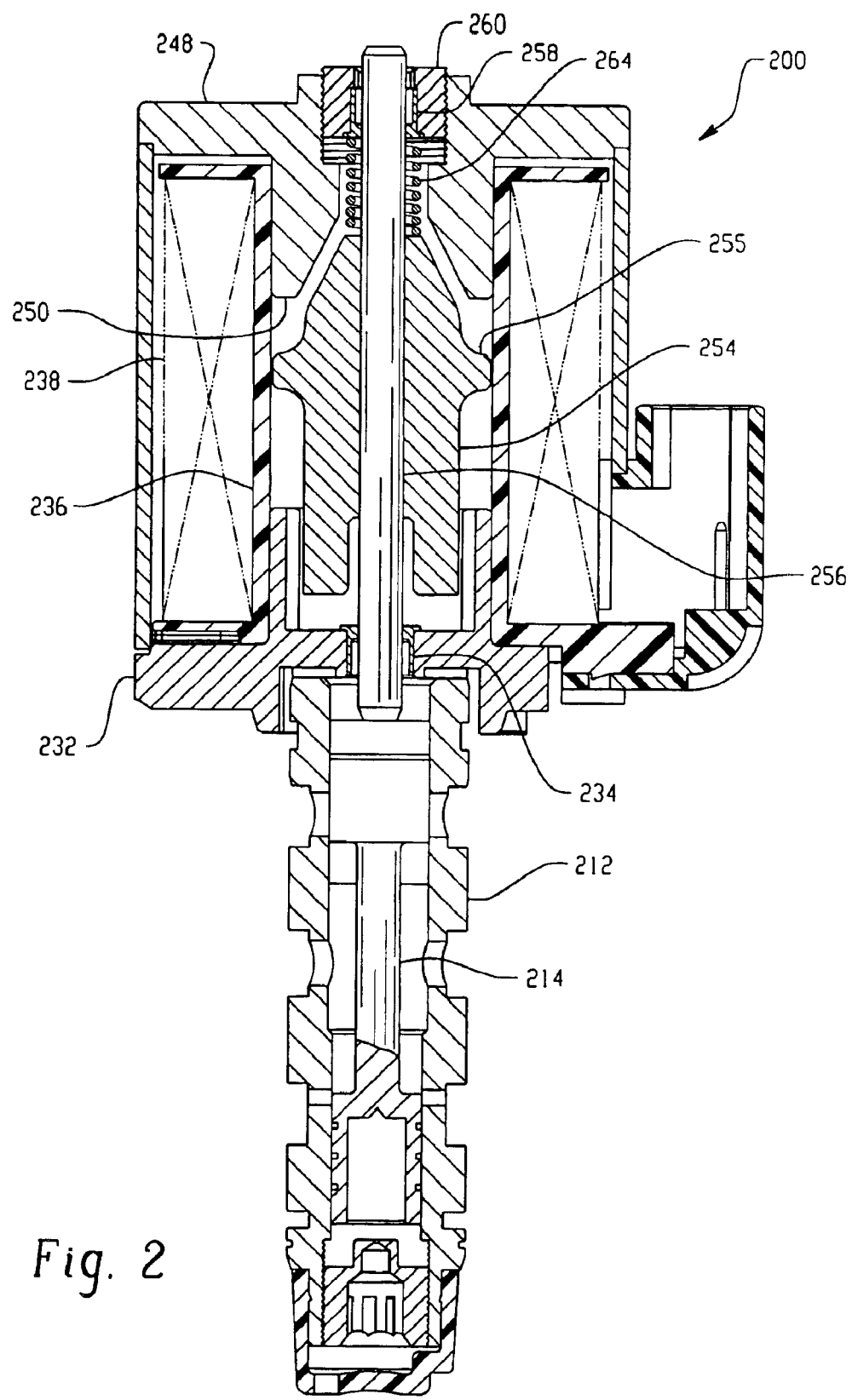
FIG. 2 is a view similar to FIG. 1 of a second embodiment of the valve of the present invention; and, FIG. 3 is a cross-section of a prior art solenoid operated valve assembly.
Figure 3:
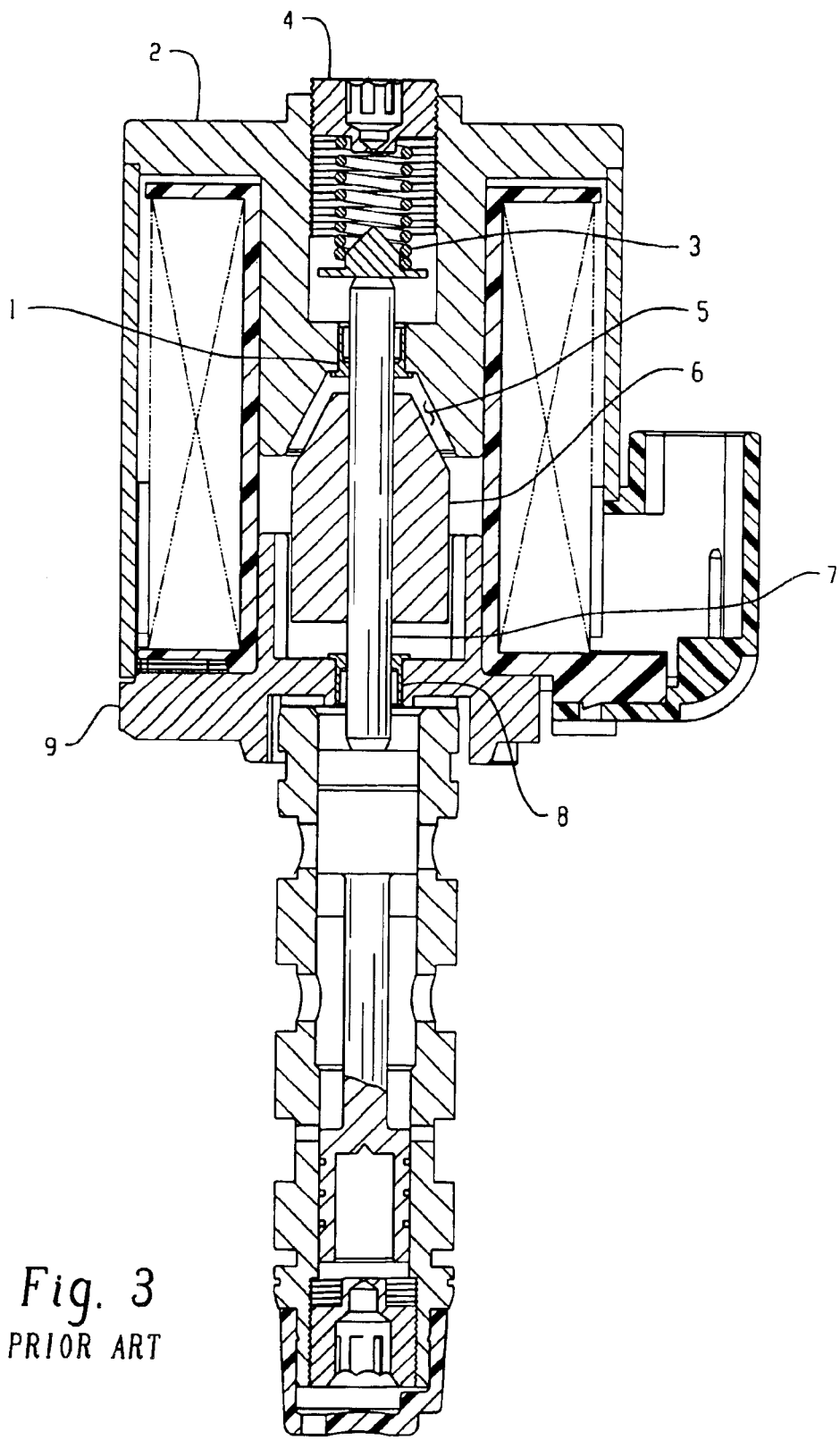

Referring to FIG. 2, another embodiment of the invention is indicated generally at 200 which has the general arrangement similar to that of the embodiment of FIG. 1 with respect to the valve body 212, valve member 214, flux collector 232, coil 238, upper flux collector 248, armature 254 and operating rod 256. However, in the embodiment 200, the armature 254 has a radially outwardly extending annular flange 255 formed thereon to provide greater forces of magnetic attraction with respect to the pole piece 250 on flux collector 248.

The adjustment member 260 is threadedly engaged in the flux collector 248 at the upper end thereof and has a bearing or bushing 258 disposed thereon at the upper end of the adjustment member 260 to thereby maximize the distance between the upper bushing 258 and the lower bushing 234 in flux collector 232.

The armature return spring 264 in the embodiment of FIG. 2 may have its upper end registered against the bushing 258 to thus retain the bushing in the adjustment member 260.

The present invention thus provides a solenoid operated proportional pressure control valve which has the upper operating rod bearing for guiding movement of the rod and armature located near the end of the operating rod. The distance between the upper and lower bearings is thus maximized for improved position and guidance of the armature movement and reduced friction and reduced hysteresis in the valve operation.

Although the invention has hereinabove been described with respect to the illustrated embodiments, it will be understood that the invention is capable of modification and variation and is limited only by the following claims.

What is claimed is:

1. A solenoid operated valve assembly comprising:
   (a) a valve body with a moveable valve member disposed therein and a first annular flux collector attached to the body with a first bearing surface and an electrical coil having one end thereof proximate said first flux collector;
   (b) an armature disposed within the coil with an operating rod disposed for movement therewith, the rod having an end thereof guided by said bearing surface and contacting said valve member;
   (c) a second annular flux collector disposed at an end of the coil remote from said first flux collector and with one axial end of said second flux collector defining a working air gap with the armature and with an end of said rod distal said first end extending within said second flux collector;
   (d) an adjustment member with a second bearing surface disposed on said second flux collector with an end of said rod distal said one end guided for movement in said second bearing surface; and,
   (e) a spring disposed about the rod and having one end registered against said adjustment member and an end opposite said one end registered against said armature for biasing said armature in one direction, wherein said adjustment member is rotatable on said second flux collector for varying the preload on said spring.

2. The valve assembly defined in claim 1, wherein adjustment preload member has said second bearing surface formed integrally thereon as a one piece member.

3. The valve assembly defined in claim 1, wherein said second bearing surface is formed on an insert in said preload member.

4. The valve assembly defined in claim 1, wherein said working air gap is formed between an axially tapered surface on said armature and a corresponding axially tapered surface on said second flux collector.

5. The valve assembly defined in claim 1, wherein said valve member comprises a spool.

6. The valve assembly defined in claim 1, wherein said spring is disposed within said second flux collector.

7. The valve assembly defined in claim 1, wherein said first bearing surface is formed on an insert disposed on said first flux collector.

8. The valve assembly defined in claim 1, wherein said rod is press fitted in said armature.

9. The valve assembly defined in claim 1, wherein said preload member is adjustable externally of the second flux collector.

10. The valve assembly defined in claim 1, wherein said preload member is threadedly engaged with said second flux collector.

11. A method of making a solenoid operated valve assembly comprising:
    (a) disposing a moveable valve member in a valve body and attaching a coil and first flux collector with a first bearing surface to the body;
    (b) disposing an annular armature with an operating rod therethrough within the coil and guiding one end of the rod in said first bearing surface and contacting said valve member with said one end of the rod;
    (c) disposing a second flux collector on the coil distal the first flux collector and forming a working air gap the first flux collector and the armature and disposing an adjustment member including a second bearing surface on said flux collector and guiding the end of the rod opposite said one end in said second bearing surface;
    (d) disposing a spring about the rod and registering one end of the spring against the adjustment member and registering an end opposite the one end against the armature and biasing the armature in one direction; and,
    (e) rotating said adjustment member and varying the preload on the spring.

12. The method defined in claim 11, wherein said step of disposing a moveable valve member comprises disposing a spool in a valving bore in the body.

13. The method defined in claim 11, wherein said step of forming a working air gap includes forming corresponding tapered surfaces on said armature and said second flux collector.

14. The method defined in claim 11, wherein said step of disposing an adjustment member includes forming said second bearing surface integrally thereon as a one-piece member.

15. The method defined in claim 11, wherein said step of forming a second bearing surface includes disposing a bearing insert in said adjustment member.

16. The method defined in claim 11, wherein said step of disposing an adjustment member includes the threadedly engaging said adjustment member with the second flux collector.

17. A method of making a solenoid operated valve assembly comprising:
- (a) attaching a valve body with a moveable spool valve therein to one end of a solenoid coil;
- (b) disposing an armature with an operating rod extending therefrom within the coil and guiding one end of the rod in a first bushing adjacent said one end of the coil;
- (c) guiding an end of said rod opposite said one rod end in a second bushing adjacent the end of said coil opposite said one coil end;
- (d) disposing a spring between said armature and said second bushing and biasing said armature in one direction; and,
- (e) disposing an adjustment member proximate said second bushing and rotating said member and adjusting the preload of said spring on said armature.

18. The method defined in claim 17, wherein the step of disposing a second bushing includes disposing said second bushing on the adjustment member.

* * * * *